United States Patent [19]
Morley

[11] Patent Number: 5,488,610
[45] Date of Patent: Jan. 30, 1996

US005488610A

[54] COMMUNICATION SYSTEM

[75] Inventor: Stephen Morley, Stoke Gifford, United Kingdom

[73] Assignee: Hewlett-Packard Company, Palo Alto, Calif.

[21] Appl. No.: 274,203

[22] Filed: Jul. 12, 1994

[30] Foreign Application Priority Data

Aug. 26, 1993 [EP] European Pat. Off. ............... 93306797

[51] Int. Cl.$^6$ .................................................... H04J 3/02
[52] U.S. Cl. ..................... 370/82; 370/105.1; 370/112; 379/93; 371/30; 371/47.1
[58] Field of Search ........................... 370/79, 82, 105.1; 379/93, 96; 371/37.1, 30, 47.1, 48, 49.1, 53

[56] References Cited

U.S. PATENT DOCUMENTS

| | | | |
|---|---|---|---|
| 5,214,650 | 5/1993 | Renner et al. | 370/934 |
| 5,331,670 | 7/1994 | Sorbara et al. | 370/105.1 X |

FOREIGN PATENT DOCUMENTS

| | | | |
|---|---|---|---|
| 0170413 | 5/1986 | European Pat. Off. | H04J 3/16 |
| 9215159 | 9/1992 | WIPO | H04L 7/00 |

OTHER PUBLICATIONS

Patent Abstracts of Japan, vol. 01, No. 3181 (E-750) 27 Apr. 1989 & JP-A-10 007 738 (K.D.D. Co Ltd).
Proceeding IEEE International Symposium on Subscriber Loops and Services 20 Mar. 1978, Atlanta (US)—pp. 126–130.
Kaiser et al. 'Digital two-wire local connection providing office subscribers with speech, data and new teleinformation services.'—p. 129, column 2, line 37—p. 130, column 1, line 18.
I.B.M. Technical Disclosure Bulletin vol. 15, No. 8, 1 Jan. 1973, pp. 2527–2528—J. Besseyre 'Self timing framing in a digital telephone system'.

*Primary Examiner*—Douglas W. Olms
*Assistant Examiner*—Russell W. Blum

[57] ABSTRACT

The present invention concerns a multiplexer for use in a system for transmitting more than one type of data, e.g. a system for transmitting voice and data. The invention eliminates transmission errors in framed data due to clock errors on the transmission side by appropriate choice of the length of multiplexer frames. Two embodiments are disclosed, one in which the frame rate of the multiplexer is greater than the frame rate of a voice coder and another in which the length of multiplexer frames is slightly adjustable to account for clock errors.

8 Claims, 8 Drawing Sheets

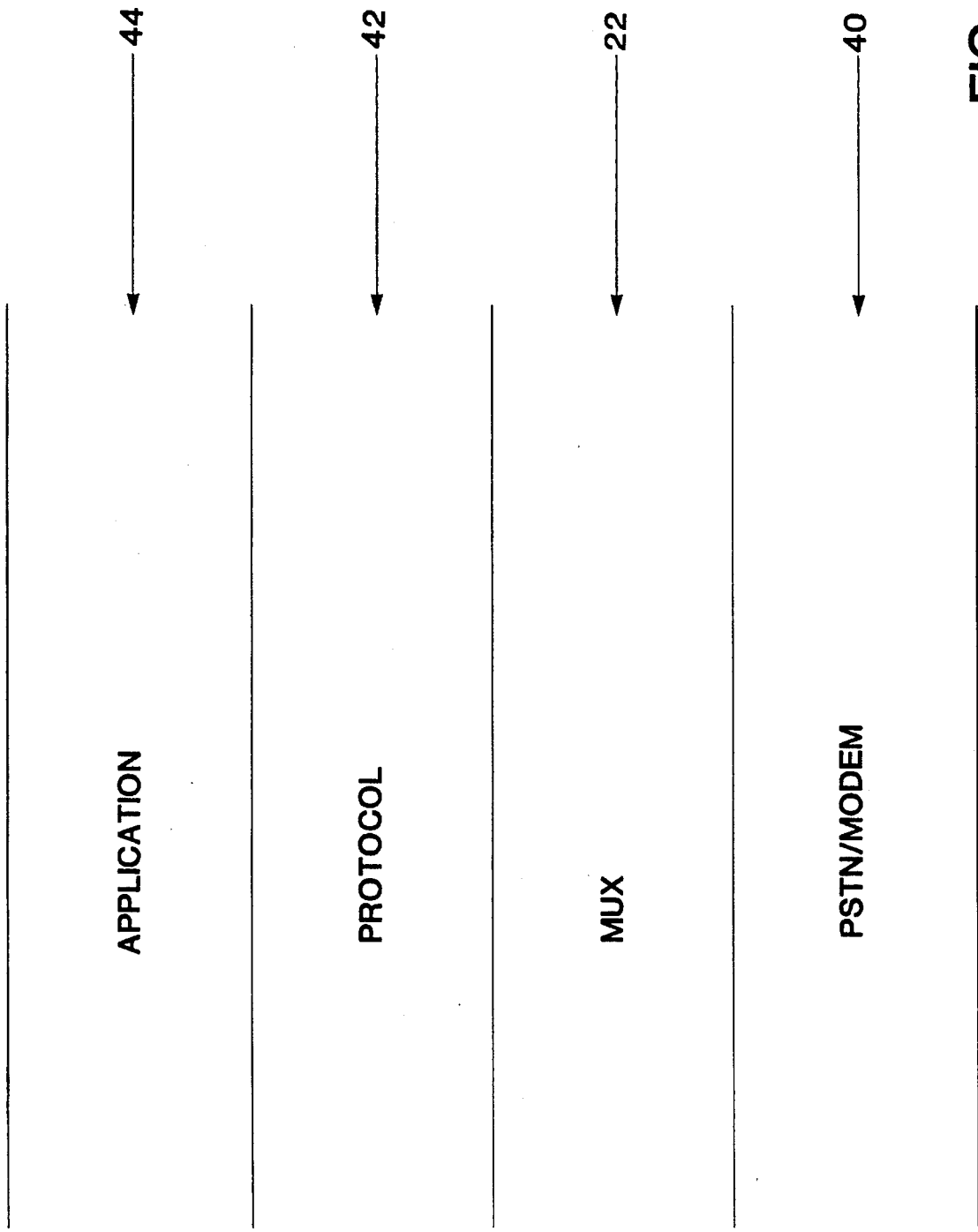

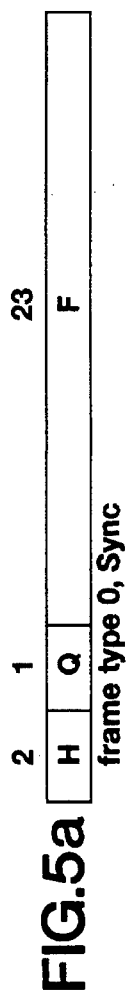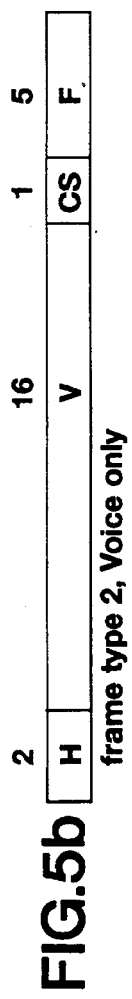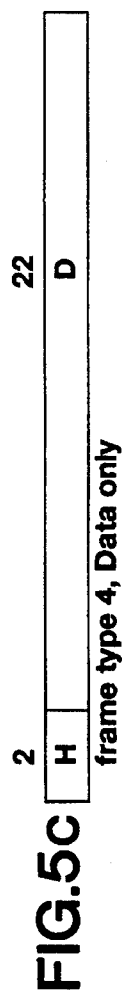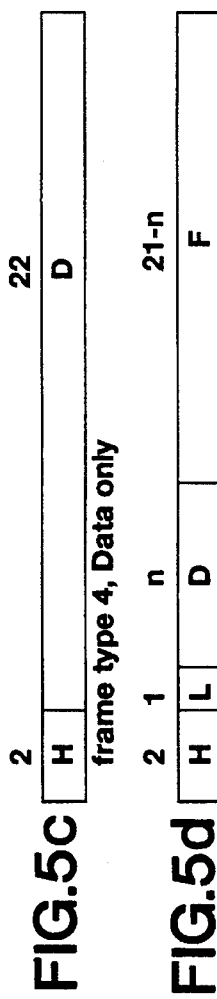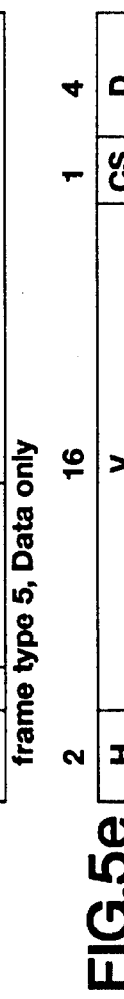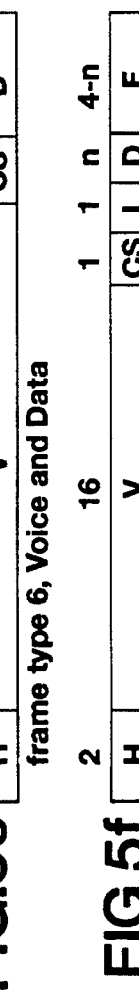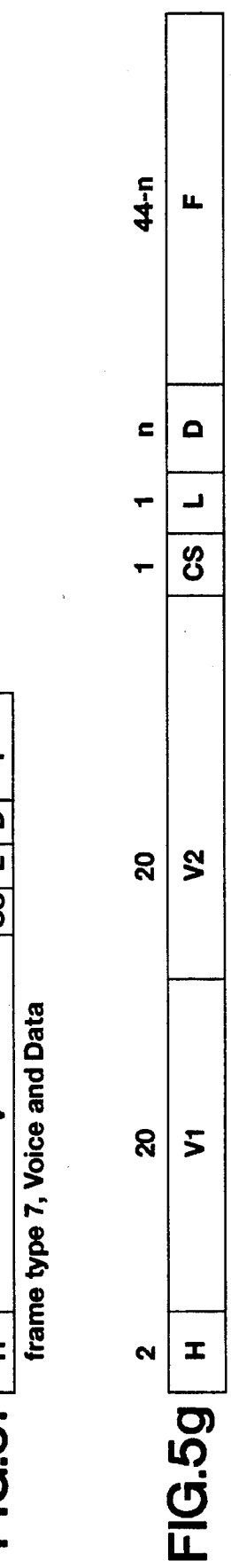

COMMUNICATION SYSTEM

The present invention relates to a multiplex system for transmitting and receiving a composite signal on a single communications channel. The present invention has application in a system handling a composite voice and data signal for allowing remote users to speak to one another and, at the same time, to share visual data. A telephone network can be used for this type of communication, either the Public Switched Telephone Network or a private telephone network.

In one known scheme, a low bit rate voice encoder samples an analogue speech waveform and generates frames of encoded voice data. These frames are transmitted on a communications channel to a remote decoder which converts the frames back to an analogue voice signal. Other (non-voice) data may be transmitted in the same communications channel as the voice frames, for example image data.

FIG. 1 illustrates the potential for timing errors in such a scheme. A first clock 1 controls the voice encoder and a second clock 2 controls the multiplexer and hence the timing for the communications channel. A third clock 3 controls the timing of the receiving voice decoder.

Error 1 is the error between clocks 1 and 2. Error 2 is the error between the clocks 2 and 3. Error 3 is the cumulative error between the clocks 1 and 3.

If clocks 1 and 2 are synchronous to each other then the voice frames can be transmitted without error on the communications channel. If clocks 1 and 2 are not synchronous to each other then a clocking error (Error 1) builds up over time and voice frames may be lost. It may be difficult or impossible in many situations to lock the timing of the voice encoder and multiplexer in which case error 1 can lead to errors in the transmission of voice information.

At the receiving end, error 3 causes a similar problem and occasionally voice frames have to be dropped or repeated.

In prior schemes different attempts have been made to overcome the problem caused by error 1.

One way is that, when one frame of timing error has built up, the transmitter either deletes a voice frame (if the voice encoder is generating data too quickly) or repeats a voice frame (if the voice encoder is generating data too slowly). This method introduces errors into the transmitted voice signal however.

Another way is for the transmitter to allocate extra bandwidth on the communications channel to allow for an overspeed voice encoder. Any unused bits are 'stuffed' and then removed at the receiver. This method has the disadvantage of compromising bandwidth efficiency on the communications channel.

The present invention aims to provide a multiplexer enabling voice frames, or other framed data, to be transmitted without degradation due to timing errors whilst maintaining efficient use of bandwidth.

The present invention also aims to provide an improved communication system for combining at least two types of data and sending a composite signal over a single physical channel.

According to the present invention we provide a system for multiplexing digital data in the form of frames of predetermined size with other data for transmission on a single physical channel, comprising means for:

a) receiving the frames of data at a first frame rate, wherein the source of framed data is controlled by a first clock;

b) receiving the other data;

c) generating multiplexer frames under the control of a second clock, the multiplexer frames being of a substantially predetermined size wherein individual frames incorporate the framed and/or other data according to which of these data is available for inclusion in that multiplexer frame and a header containing information about the contents of the frame, whereby the length of the multiplexer frames is chosen so as to reduce or eliminate transmission errors due to timing errors between the first and second clocks.

Here the term 'physical channel' is intended to cover radio channels as well as hard-wired channels and is used to draw the distinction between physical and logical channels.

For the purposes of the statements of the present invention the term 'header' shall cover any portion of a frame carrying information about the contents of the frame whether or not that portion is at the front of the frame.

The present invention has the advantage of eliminating the effect of transmission timing errors without compromising bandwidth efficiency.

Preferably the present invention relates to a system in which the multiplexer frames are transmitted at a second frame rate which is greater than the first frame rate. In such an embodiment, the flexibility in the content of each multiplexer frame means that sufficient bandwidth can still be provided for the framed data.

Alternatively, in another embodiment the present invention may comprise:

means for comparing the clock rates of the first clock and the second clock;

means for calculating the cumulative error (the first error) between the first and second clocks and for adjusting the length of a multiplexer frame to be transmitted from the multiplexer by a predetermined amount whenever said first error reaches a predetermined threshold.

Preferably, the length adjustments are derived by measuring the position of the headers in the received multiplexer frames.

Advantageously, as well as representing multiplexer frame content information, the headers are also used as frame delimiters.

It is preferred that the multiplexer frame headers are error protected and the set of headers chosen to represent frame content information are hamming codes.

Preferably the framed data is voice data. In embodiments to be described a voice encoder is used to compress and digitise the voice data, generating frames of predetermined size which are sent to the multiplexer.

Specific embodiments of the present invention will now be described, by way of example, with reference to the accompanying drawings of which:

FIG. 4 is a diagram of the voice and data protocol stack;

FIG. 5 shows the structure of multiplexer frames;

SYSTEM OVERVIEW

Figure 2:
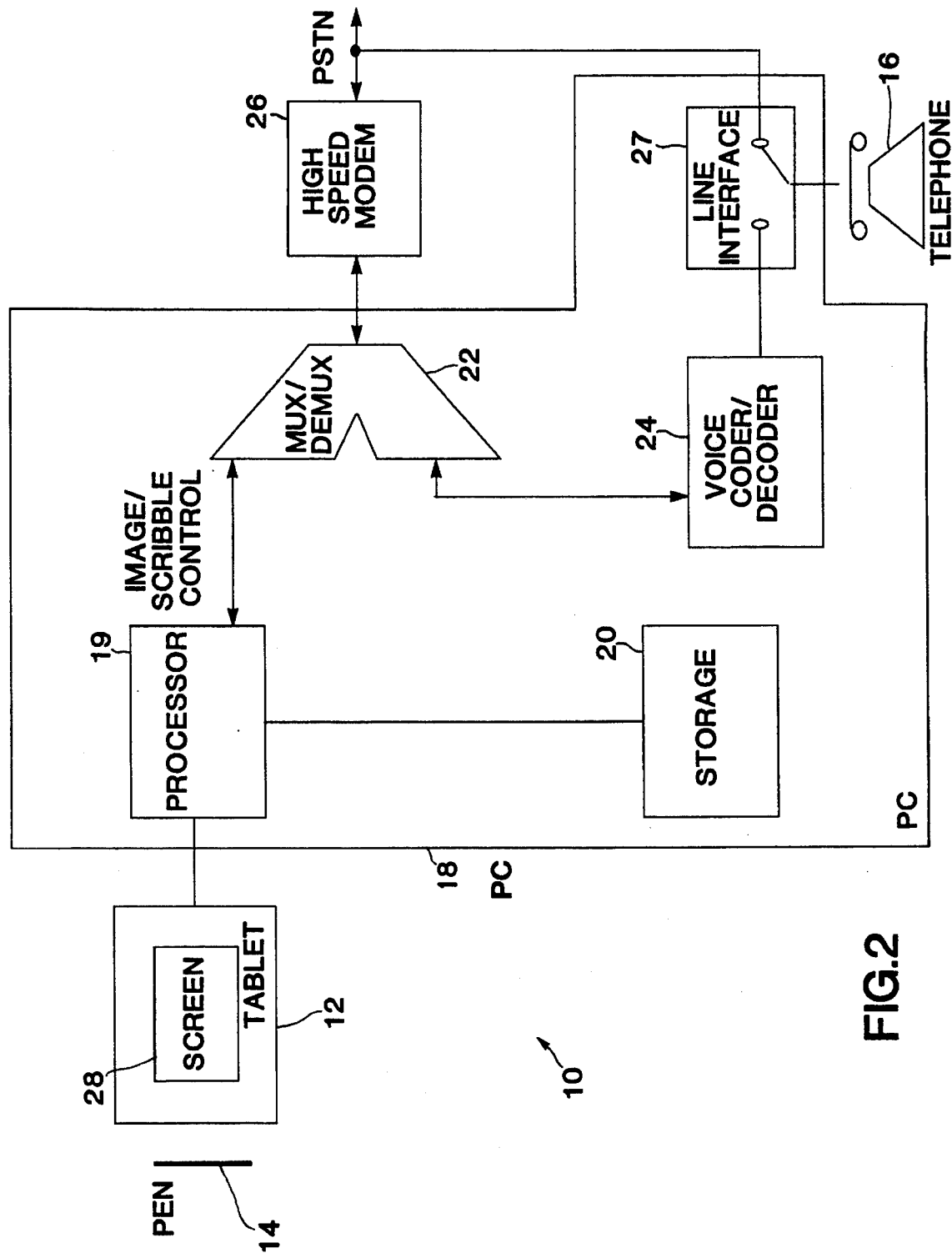
FIG. 2 is a block diagram showing the main components of a communication system of the present invention.

FIG. 2 is a block diagram of a communication system 10 of the present invention which comprises:

a graphics tablet 12 having a pen 14;

a telephone 16;

a high speed modem 26;

a controller 18 in the form of a PC having:
 a processor 19;
 storage means 20;
 a multiplexer/demultiplexer 22;
 a voice coder/decoder 24;
 and a line interface 27.

The system 10 can be used to share voice and visual data with another user of a similar system. Once a connection between two systems 10 of the present invention has been established, the users utilise their telephone handsets in the normal manner to talk to one another and they use their tablets 12 to exchange visual data. The visual data can simply be handwritten input made by the users, either textual input or drawings or a mixture of these. Alternatively the users can exchange stored images, again either text or image or a mixture of these, and can subsequently discuss the exchanged images, making annotations using the pen 14 as they wish. Annotations made by one user appear superimposed on the image displayed on the tablet 12 of the other user. Voice and visual data are transmitted so as to remain in synchronisation as perceived by the recipient.

The same reference numbers suffixed 'a' will be used for the corresponding components of a remote system.

Figure 3:
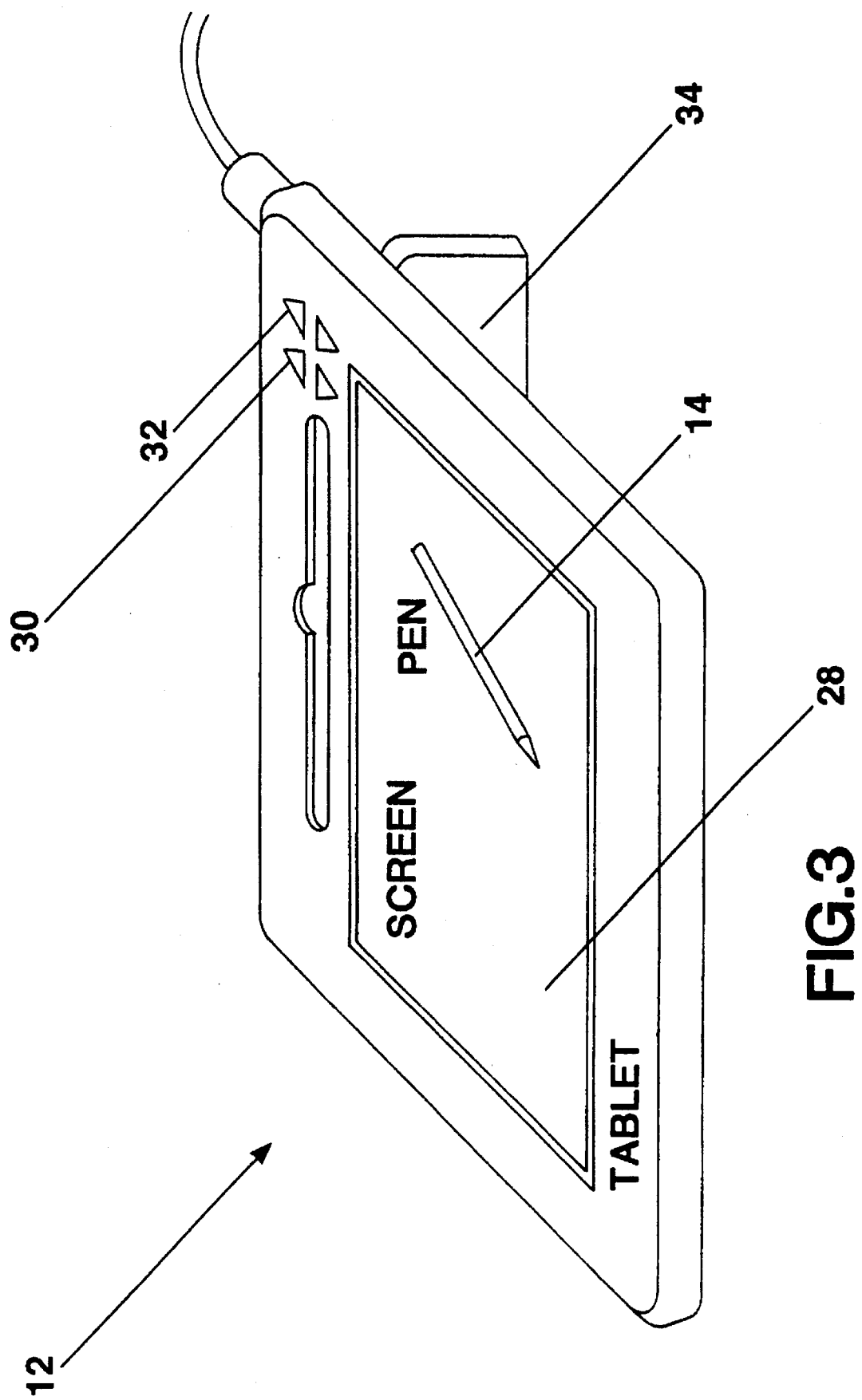
FIG. 3 is a perspective view of a graphics tablet for use in connection with the present invention.

FIG. 3 shows in more detail the tablet 12 which is a digitising tablet having a VGA resolution liquid crystal display screen 28 including an electromagnetic digitiser and a non-tethered, passive pen 14. The tablet 12 is provided with contrast and brightness buttons 30 and 32. The tablet 12 has a hinged stand 34 to provide an angled writing surface for the user.

The controller 18 is a PC which will normally be housed in a box sited under the user's desk. The processor 19 is an Intel 386 processor. The storage means 20 provides 4 Mbytes of RAM, an 80 MBYTE hard disc and a floppy disc drive. The multiplexer 22, voice coder/decoder 24 and the line interface 27 use expansion slots on the PC.

The multiplexer/demultiplexer ('mux') 22 comprises a GMM/Sync 2 CCP intelligent communications card sold by GMM Research together with controlling software. Embodiments of the mux 22 will be described in detail with reference to FIGS. 5 to 9.

The voice coder/decoder ('coder') 24 is a low bit rate voice encoder/decoder in the form of a standard PC speech card such as the CACI AC5–50 together with software implementing a speech encoding algorithm of the linear predictive type such as a CELP (codebook excited linear predictive) algorithm. The voice coder 24 generates fifty voice frames per second at an output rate of 6.4 kbps. The sampling is performed at 8 Khz and one frame of encoded voice data typically represents 20 mS of analogue speech.

The line interface 27 is operable to switch the telephone 16 between the PSTN and the coder 24 and in the latter case also provides power, isolation and the four-to-two wire conversion normally provided by the local telephone exchange to the telephone 16.

The modem 26 is a V32 or V32 bis full duplex high speed synchronous modem operating at a rate of at least 9.6 kbps.

The process of call set up/close down will now be described.

Referring to FIG. 2, initially the line interface 27 connects the telephone 16 to the PSTN line. The speech coder 24 is disabled and the comunications card of the mux 22 is programmed to exchange AT commands with the modem 26.

To make an outgoing call, the user of the originating station lifts the telephone handset and will hear the normal PSTN dial tone. He/she dials the number of the remote voice and data device in the normal way.

At the remote device the telephone will ring. Its modem will send a RING response message to the communications card of the receiving mux 22a which sets a status to indicate that this device is the answering station. The other user lifts the telephone handset and a normal voice conversation can ensue.

At some point in the voice call, the users may decide to start a voice and data call. They both press a CONNECT button on their displays. At this point the communications cards of the muxes 22 and 22a send commands to the modems 26 and 26a which causes them to go on line and begin to train up (ATD is sent to the originating modem and ATA to the answering modem).

The line interfaces 27 and 27a connect the telephones 26 and 26a to the speech coders 24 and 24a and the speech coders start up.

When the modems 26 and 26a have trained, a CONNECT response is sent to the communications cards of the muxes 22 and 22a which then execute the multiplexer code. When the multiplexers have synchronised, a message is displayed at the screens 28 and 28a and the users may now proceed with a voice and data call.

The call is cleared by either user replacing the telephone handset, both the local and remote devices return to the initial state During a conversation in which voice and visual data are being shared, the telephone 16 is switched into the coder 24. Analogue voice signals from the telephone handset are sent to the coder 24 which digitises and compresses these outgoing voice signals and generates frames of voice data. The voice frames are sent to the mux 22 using a 'terminate and stay resident' (TSR) program running on the PC. Pen movements on the tablet 12 are sampled by the PC, encoded and written to the mux 22. Images stored on the PC which are selected by the user of the tablet 12 for sending are written to the mux 22 and to the tablet 12 for display. The user can annotate such images. The mux 22 multiplexes the voice frames received from the coder 24 and the data received from the PC to form mux frames including both voice and image data. Further detail on the mux frames is given below. The mux frames are sent to the modem 26 which converts them into an analogue signal which is sent over the PSTN.

The analogue signal received is converted back into frames of digital data by the modem 26a and sent to the mux 22a where they are demultiplexed into frames of voice data and a stream of data. The voice frames are sent to the coder 24 using the same TSR program and the coder 24 decompresses the voice data and converts it back into an analogue signal which is sent to the telephone 16. The processor 19 reads non-voice data and responds accordingly eg by displaying a corresponding image on the screen 28 of the tablet 12 or by performing the appropriate control function.

It will be understood that a system according to the present invention comprises both the transmitting and receiving components of the mux 22.

The system is designed so that voice and visual data remain in synchronisation as perceived by the recipient.

In an alternative mode of operation the line interface 27 connects the telephone 16 directly into the PSTN for use as a standard telephone.

The multiplexer 22 will now be more fully described.

FIG. 4 represents the communication stack of a voice and data system.

The physical layer 40 transmits and receives data between two voice and data devices. In FIG. 2, a high speed modem (V32bis) is used, connected to the Public Switched Telephone Network (PSTN). A serial link from the modem DTE port provides the interface to the multiplexer layer.

The multiplexer layer 22 multiplexes the voice and dam signals, adds synchronisation information, and transmits the composite signal to the physical layer 40. The voice signal is generated by a speech coder, in the form of regular fixed length frames. The data signals are generated by the protocol layer and may be continuous data, for example when sending an image, or more 'bursty' data, for example when sending sketch marks. Receive data is demultiplexed into voice and data components according to the synchronisation information. The multiplexer can provide one or more separate data channels (non voice) to the upper layers of the communication stack. Error correction may be added to the data channels by the multiplexer. In the embodiments described the interface between the mutiplexer and physical layers is an RS232 serial link.

The protocol layer 42 manages a connection between two voice and data devices. Protocol layers in two connected voice and data devices communicate with each other via data channels on the multiplexer to negotiate call parameters and to exchange signals from the application such as selecting documents, turning pages in a document etc. The protocol is able to dynamically create and destroy data channels on the multiplexer for sending application data such as images or sketching information. In the embodiments described the interface between the protocol and multiplexer is an API communicating through shared memory on the multiplexer expansion card in the PC.

The application layer 44 takes pen input from the digitising tablet and codes it into sketching information. It also displays images and sketching on the display. Via the lower layers of the communication stack it communicates changes at the pen and screen interface to a remote voice and data device. In the embodiments described, the application layer communicates with the protocol layer using software messages.

As previously stated, the multiplexer generates a composite voice and data signal which is transmitted to the physical layer. This composite signal is organised into frames each containing a header for synchronisation purposes. Each frame may also contain one or more complete voice frames and/or other non voice data. In the embodiments described the frames are transmitted and received on a synchronous RS232 serial link between the multiplexer and a PSTN modem. The clocks for this link are provided by the modem. This multiplexer system may use other means of providing the physical channel and the link between the multiplexer and physical layers may be synchronous or asynchronous, serial or parallel.

The mux transmits frames containing a header and which may contain one or more complete voice frames and data. The mux 22 transmits continually even in the absence of data from the applications. The content of each frame is determined by the applications. The voice content, data content (or both) of a frame may be dropped according to what data is available at the time the mux frame is being generated.

The structure of the multiplexer frames is optimised according to 'long term' requirements of the application and protocol layers, e.g. voice coder data rate and frame rate, data bandwidth requirements . . . It may change during the call (after negotiation by the protocol layers) and it need not be the same in the transmit and receive directions. The multiplexer places a number of constraints on the frame structure which ensure that clock error 1, as defined above, is eliminated. These constraints will be defined in the descriptions of the two embodiments of the multiplexer which follow.

FIG. 5a–5g shows the structures of some possible mux frames. The length of a frame is fixed by the protocol being used at the relevant time, although the frame length can be altered from time to time to optimise operation according to which applications are active. The type of frame transmitted changes according to the 'short term' requirements of the application and protocol layers, e.g. what data must be transmitted at a particular point in time. The various fields in the mux frames will now be explained.

In FIGS. 5a–5f the frame length is 24 octets, the mux 22 is transmitting one voice frame per mux frame and the coder frame ram is 50 frames per second. In FIG. 5g the frame length is 88 octets and the mux is transmitting two voice frames per mux frame. In each case the parts of a frame are referenced as follows and the number of octets in each part is shown underneath that part:

H—header: All multiplexer frames contain a header which identifies the frame type. It is used to achieve and maintain synchronisation and also to identify the contents of a frame. Each header is two octets in length. In the basic multiplexer scheme there are 16 possible headers and hence 16 frame types. The 16 codes used have a hamming distance of at least five from each other, allowing the receiver to correct up to two bit errors in a header. The codes used are set out in a table below. The basic multiplexer can support one voice channel and up to three separate data channels.

V—voice: The V field of a multiplexer frame is optional and, if present, may be one or more complete voice frames. Voice frames are never split across multiplexer frames, this allows multiplexer frame synchronisation to be used for voice frame synchronisation. The length of the V field depends upon the speech coder used, typical values are 15 to 25 octets. Some speech coders generate a checksum (the CS field) which can be used for error detection at a remote speech decoder. The multiplexer at the receiver passes this transparently to the speech decoder, it is not used for error detection by the multiplexer.

D—data: Data (non voice) fields. All remaining octets after V and H fields have been allocated can be used for data. If there is not enough data from a channel to fill the frame then an L (length) field must also be transmitted to indicate the number of data octets in the frame. The L field is always one octet. Each multiplexer frame contains data from only one channel.

F—fill: these are unused octets in a frame and they are always 0.

Note that if there is no voice or data to be sent then the multiplexer sends a 'sync' frame (type 0) with the 'in synchronisation' qualifier, see below.

Q—qualifier: a Q octet is only transmitted in 'sync' frames (type 0). It is used when achieving synchronisation with a multiplexer in a remote voice and data device as described in the following section.

Sixteen possible headers for supporting one voice channel and up to three data channels are shown in the table below, with the header value expressed in hexadecimal (indicated by the '0x' prefix).

| Header Type | Frame Type | Header Value |
| --- | --- | --- |
| 0 | Sync | 0 × 19b3 |
| 1 | Extend | 0 × 007f |
| 2 | Voice Only | 0 × 4ce6 |
| 3 | Not Defined | 0 × 0000 |
| 4 | Data 0 | 0 × 34e9 |
| 5 | Data 0* | 0 × 3366 |
| 6 | Voice + Data 0 | 0 × 2ad5 |
| 7 | Voice + Data 0* | 0 × 1e3c |
| 8 | Data 1 | 0 × 4b69 |
| 9 | Data 1* | 0 × 52da |
| 10 | Voice + Data 1 | 0 × 552a |
| 11 | Voice + Data 1* | 0 × 61c3 |
| 12 | Data 2 | 0 × 664c |
| 13 | Data 2* | 0 × 7870 |
| 14 | Voice + Data 2 | 0 × 078f |
| 15 | Voice + Data 2* | 0 × 4b16 |

Frame types marked with an asterisk are those in which the data does not occupy all of the available space in the frame. A length field is added in these frames. Header type 1 is to allow for future expansion of the header length to four octets.

Frame type 3, 'extend', is used to lengthen the header field. This is for future expansion where more frame types may be required.

As explained above, the format of the mux frames may need to change according to the particular characteristics of a call. A change in format is notified to the receiving mux 22a by the transmitting mux 22 sending a frame with header type 0 and a qualifier value of 0×38.

Synchronisation

Synchronisation between two multiplexers is achieved and maintained by searching for the mux frame headers. Synchronisation frames (type 0) are transmitted, the Q field indicates the synchronisation state of the local multiplexer as follows:

| Q field (hex) | Meaning |
| --- | --- |
| 0 × 0 | Out of synchronisation |
| 0 × 7 | Synchronising |
| 0 × 38 | In synchronisation |

At the start of a call and after a loss of synchronisation a multiplexer transmits a 'sync' frame (type 0) with the 0×0 qualifier. It searches the receive data for sync frames and will continue to transmit 'sync' frames with the 0×0 qualifier until it has synchronised to these.

It then transmits 'sync' frames with the 0×7 qualifier to indicate that it is synchronising. When the remote multiplexer indicates that it also synchronising (ie 'sync' frames with the 0×7 qualifier are being received) then the multiplexer indicates that it is in synchronisation by sending one 'sync' frame with the 0×38 qualifier. Subsequent frames can then be of any type according to voice or non voice data available to the multiplexer.

The frames used to achieve synchronisation sync may be shortened frames for greater efficiency or may alternatively be full length frames if that is preferred in the particular implementation.

Synchronisation is maintained by checking headers in the receive data. When a frame has been received the two octets in the header position in the frame are 'scored' in turn against each header in the list of possible headers. This scoring is a bitwise exclusive-OR, the number of bits set to one after this operation indicates the number of bits different to the header being matched, ie the number of errors. Therefore, if the header in the receive frame is error free it will be a perfect match to one of the headers in the list of possible headers and the 'score' will be 0. If no headers score 0 then the header with the lowest score is chosen and a count of receive frame errors is incremented. If three consecutive frames are received with headers in error then a resynchronisation is forced.

Synchronisation is regained during a call using the same method as described above for achieving synchronisation at the start of a call.

Error Protection

Frame headers carry their own error protection. They are hamming codes with a distance of five from each other. This guarantees that a receive header with one or two bit errors will be corrected to the correct header.

Due to the synchronous nature of voice, an error correction scheme using block retransmissions cannot be used. Some voice coders incorporate forward error correction (FEC) and some send a checksum. Both schemes increase the bandwidth required by the voice channel, the additional information is used for error correction/detection at the voice decoder. The multiplexer passes this extra information transparently and does not perform any local error protection on the voice frames. In the embodiments described the speech coder uses FEC, the extra bandwidth for this is taken into account in the number of octets reserved for a voice frame in each multiplexer frame.

The multiplexer may perform error correction on data channels, thus ensuring error free data to the protocol and application layers. The protocol negotiates which data channels (if any) use error correction. The error correction scheme used is V42 which is a known standard that retransmits blocks that are received in error.

First Embodiment

If the voice encoder and communications channel clocks are not synchronous and the encoder clock is overspeed then voice frames will be lost at the transmitter as the multiplexer frame rate is too slow to provide transport for all of the voice frames arriving from the voice coder.

To overcome this problem, in this embodiment, the multiplexer frame length is chosen so that the multiplexer frame rate is faster than the voice encoder frame rate thereby ensuring that no voice frames are lost at the transmitter.

In this embodiment of the invention, the multiplexer uses fixed length flames. The length of the frame is carefully chosen to eliminate effects of clock error 1. The following constraints ensure this:

1. Minimum multiplexer frame length=nH+nV
   where nH: Number of octets in the H (header) field (=2)
   nV: Number of octets in the V (voice) field, this is always an integer multiple of the voice frame length plus any FEC or checksum octets
2. Maximum multiplexer frame length=(nOS/nFS)−1
   where nOS: Number of octets transmitted on the physical layer per second
   nFS: Number of frames produced by the speech coder per second The '−1' in this calculation ensures that multiplexer frame rate is always faster than the speech coder frame rate thereby ensuring that voice frames are not lost at the transmitter.

For example nOs=1200 octets/second, nFs=50 frames/second, nV=17 octets

Minumum multiplexer frame length=2+17=19 octets

Maximum multiplexer frame length=(1200/50)−1=23 octets

In this example, the mulitplexer may use a frame length between 19 and 23 octets to eliminate the effects of clock error 1.

Figure 6:
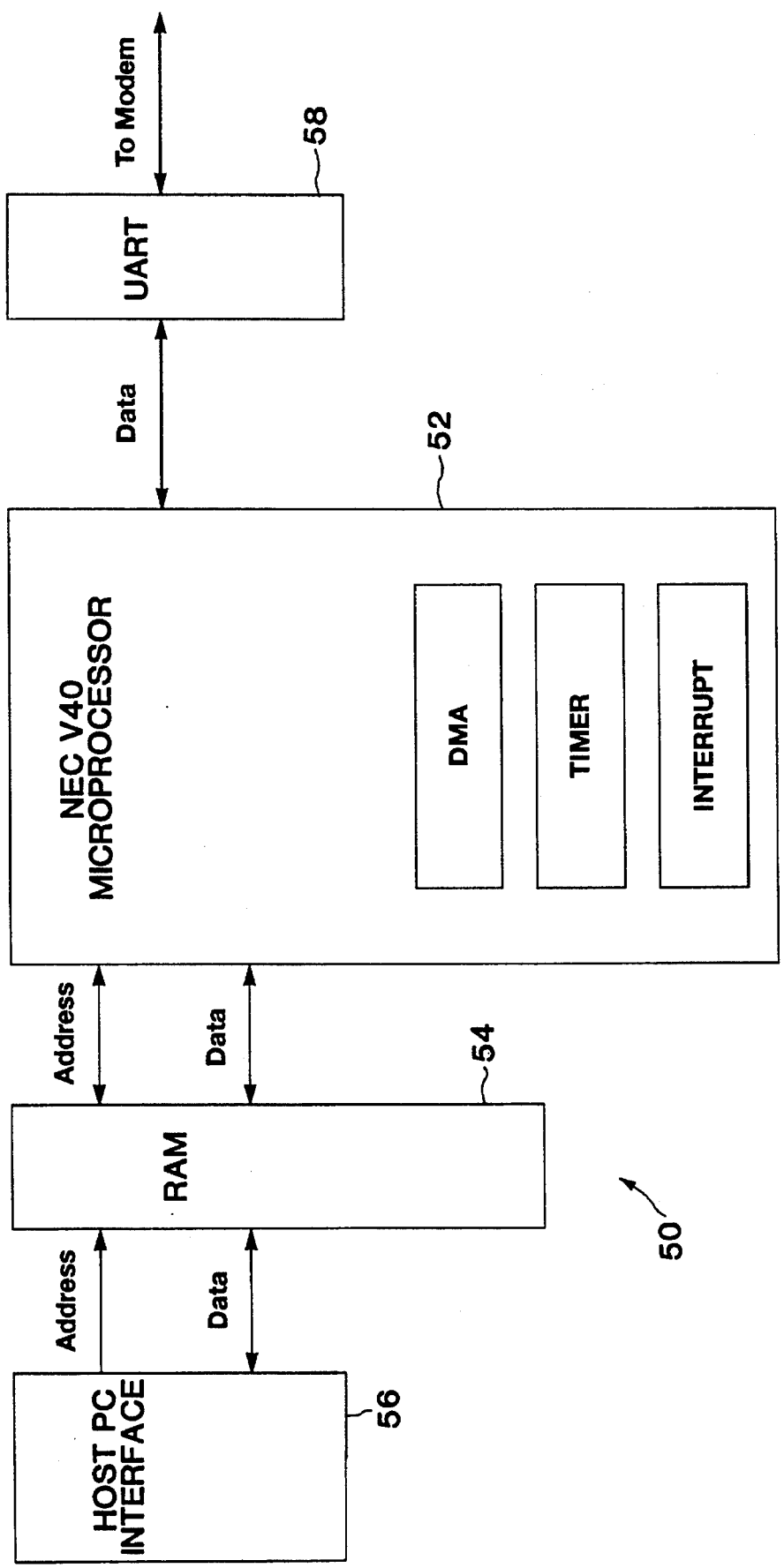
FIG. 6 is a block diagram of the components of first and second embodiments of the multiplexer of FIG. 2.

In one implementation of this embodiment, the multiplexer 50 is implemented in software which executes on an intelligent communications card fitted in a host PC. FIG. 6 is a block diagram of this card.

The multiplexer 50 comprises:

an NEC V40 microprocessor 52;

random access memory (RAM) 54;

a host PC interface 56;

a UART 58.

V40 comprises:

the NEC V40 is an integrated micoprocessor which features a 16 bit CPU and on chip peripherals. These include a DMA controller for high speed data transfer between memory and external peripherals, a Timer for counting or timing V40 internal and external events, and an interrupt controller.

The host PC interface 56 allows the PC to read to and write from RAM 54 on the intelligent communications card. At power up the V40 program, which implements the multiplexer functionality in this embodiment is written to the RAM via this interface. During multiplexer operation the host PC writes commands, voice frames and non voice data to buffers in RAM 54. It also reads status, voice frames and non voice data. A single data channel is used for data transmission.

In the transmit process, the V40 program reads voice and non voice data from these buffers and adds headers to form multiplexer frames in memory. These frames are then output to the UART (and hence the modem) using DMA.

Figure 7:
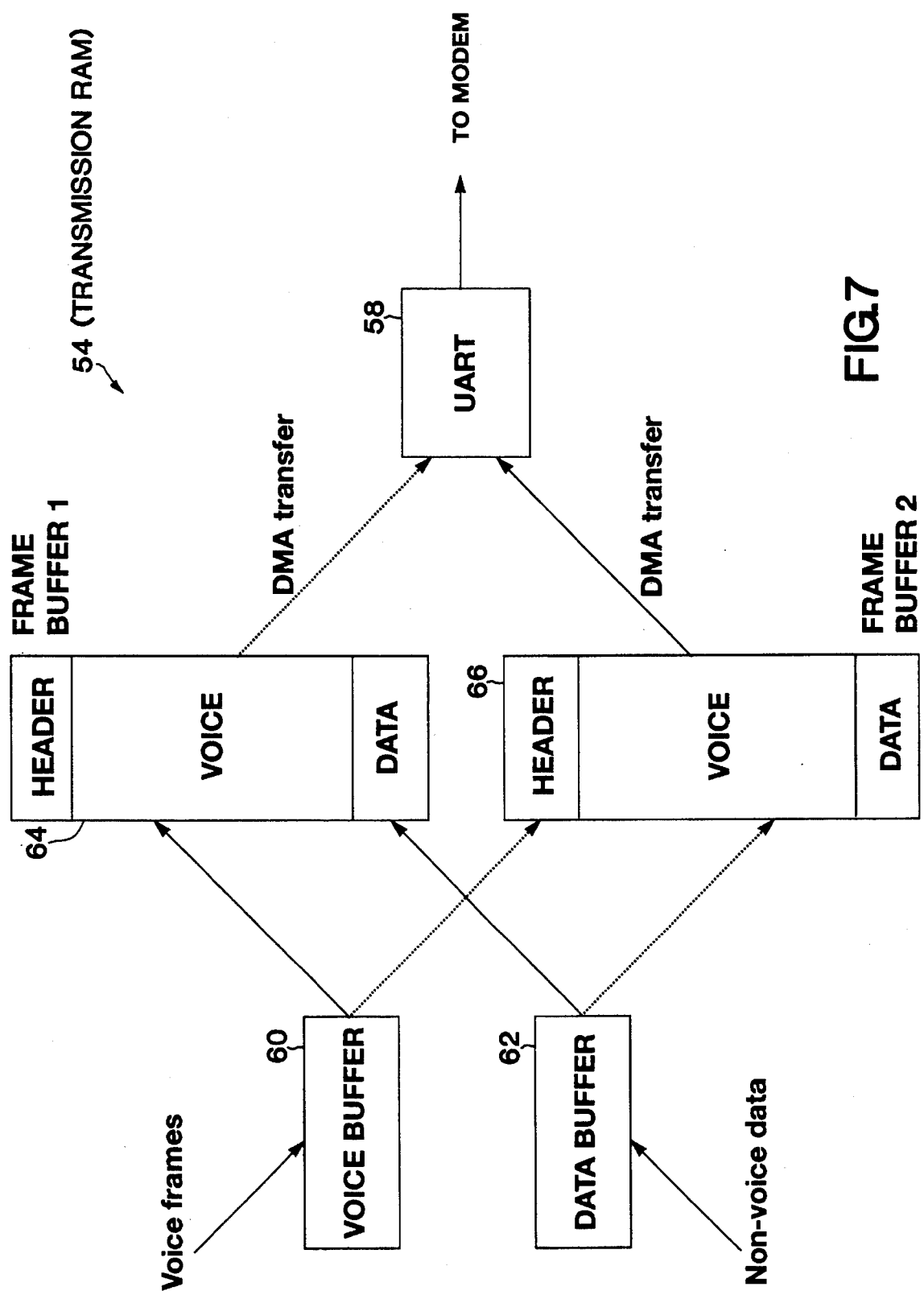
FIG. 7 is a block diagram of the transmit buffers of the multiplexer.

FIG. 7 illustrates the buffers in RAM 54 used for transmission. A voice buffer 60 and a data buffer 62 send data alternately to two frame buffers 64 and 66. Thus there are two buffers 64, 66 holding assembled multiplexer frames in the transmit direction. At any one time, one buffer is being addressed (written to) by the multiplexer and the other is being read by the DMA controller. This is indicated by solid lines in FIG. 6. The dashed lines represent the alternative paths which are not being used at that point in time.

When a frame has been output the DMA controller automatically switches buffers and begins to output the next multiplexer frame. An interrupt is generated which triggers the V40 to begin assembling a new transmit frame.

Figure 8:
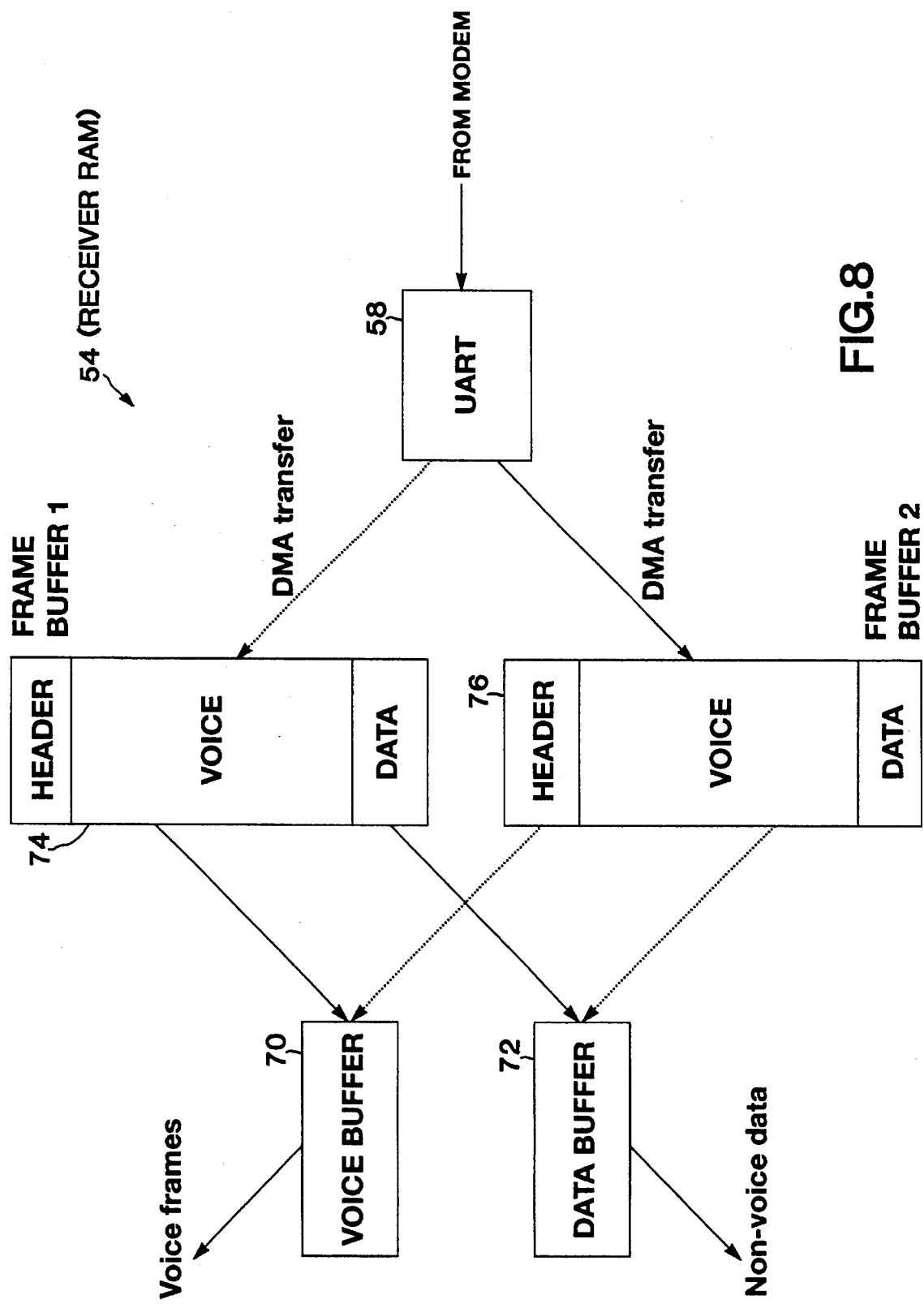
FIG. 8 is a block diagram of the receive buffers of the multiplexer.

In the receive direction, incoming multiplexer frames are written into buffers in RAM using DMA. FIG. 8 illustrates the buffers in RAM 54 used for reception. As with the transmit direction, there are two buffers 74 and 76 for receive frames. When a frame has been input using one of the buffers 74 or 76, the DMA controller automatically inputs the next frame into the other one of these buffers. An interrupt is generated which triggers the V40 to begin dis-assembling the frame just received. The header of a received frame is checked and status, voice and non voice fields are written to voice and data buffers 70 and 72 as appropriate.

Frames of voice dam are supplied to the voice decoder from the receive voice buffer 70. These can be read at a rate derived from the voice decoder clock. If the voice decoder and communications channel clocks are not synchronised then frame slip will occur over time and whole voice frames will either be missed or read twice by the voice decoder.

During synchronisation, the voice and data buffers in the host interface are not used, synchronisation frames are generated by the multiplexer.

In the embodiment described the modem data rate is 14400 bps or 1800 octets per second. The voice coder operates at 6800 bps and generates 50 frames per second. Each voice coder frame is therefore 17 octets.

Using the equations above:

Minumum multiplexer frame length=17+2=19 octets

Maximum multiplexer frame length=(1800/50)−1=35 octets

A frame length of 24 octets can, for example, be chosen.

The following sections list the pseudo code for this embodiment. The software has been written in C++, an object oriented programming language. Only those sections of the software running on the intelligent communications card that relate to the multiplexer have been described here.

```
/*

Main

Define objects and execute multiplexer controller

*/

// Object definitions

MuxController      MuxCtrl
    TxFrame            OutFrame
    RxFrame            InFrame main()
    {
        do
        {
            MuxCtrl.Update()
        }
        while(1)
    }
```

```
/*

HostInterface

Defines and controls the interface between the host PC and the multiplexer.

*/ class HostInterface

// The following buffers contain control, status, voice and data
    // exchanged between the multiplexer and the host PC :

MUXCOMMAND      // Commands from the host PC to the multiplexer
    MUXSTATUS       // Status returned to the host PC from the mutliplexer
    VOICEIN         // Voice frames to be transmitted by the multiplexer
    VOICEOUT        // Voice frames received by the mutliplexer // Note that there is one DATAIN and DATAOUT buffer allocated for each
    // data channel on the multiplexer.

DATAIN          // Data (non voice) to be transmitted by the multiplexer
    DATAOUT         // Data (non voice) received by the multiplexer // Methods ReadCommand()           // Reads a command from MuxCommand
                                // Relevant commands are :
                                // MUXOFF : terminates multiplexer execution WriteStatus(STATUS)     // Writes status to MuxStatus
                                // Relevant stati are :
                                // SYNCHRONISED : multiplexer has synchronised
                                // RESYNCHRONISING : multiplexer has lost
                                // synchronisation
```

```
        /*

StateMachine

5       */ class StateMachine

// Methods
10
        GotoState( STATE )   // Sets statemachine to a new state, STATE Getstate()           // Returns the state of statemachine

15
```

```
         /*

MuxController
5
         Top level control for the multiplexer. The action performed depends upon the current state
         of the multiplexer.

*/
10
         class MuxController : HostInterface, StateMachine    // Note inheritance // A multiplexer can be in one of the following states :

15       RESYNCHRONISE           // Initialises the multiplexer for a resync, at
                                 // power up or after a sync loss
         SYNCHRONISING           // Transmit and receive synchronisation frames
         VOICEDATA               // Transmit and receive voice and data frames 20       // Methods Update()                // Call handler for appropriate state of the
                                 // multiplexer
         {
25             switch MuxCtrl.GetState ()
               {
                     case RESYNCHRONISE :

MuxCtrl.Resynchronise()
30                          MuxCtrl.GotoState( SYNCHRONISING )

case   SYNCHRONISING :

MuxCtrl.Synchronising()
35
                     case   VOICEDATA

MuxCtrl.VoiceDataHandler()
```

```
            }
            while (1)
    }

5   Resynchronise()
    {
            // Stop and reinitialise DMA channels
            InFrame.DmaStop()
            OutFrame.DmaStop()
10
            // Start input and output DMA channels
            // of synchronisation
            InFrame.DmaStart()
            OutFrame.DmaStart()
15
            // Send and receive 'out of sync' synchronisation frames
            InFrame.SYNCSTATE = OUTOFSYNC // Write multiplexer status to host PC
20          MuxCtrl.WriteStatus( RESYNCHRONISING )
    }
```

```
Synchronising()         // Send appropriate synchronisation frame
{
        if InFrame.Read() != NOFRAME
        {
                switch Inframe.SYNCSTATE
                {
                        case OUTOFSYNC :

OutFrame.SendSyncFrame( 0x0 )

case   SYNCING :

OutFrame.SendSyncFrame( 0x7 )

case   INSYNC :

// Send only one frame of this type then advance
                                // state and inform host that the multiplexer is
                                // now in synchronisation
                                OutFrame.SendSyncFrame( 0x38 )
                                MuxCtrl.Gotostate( VOICEDATA )
                                MuxCtrl.WriteStatus( SYNCHRONISED )
                }
        }
}

VoiceDataHandler()    // Send voice and data frames
{

// Copy receive voice frames to host PC
        if  InFrame.VOICEBUFFER full
        and VOICEOUT empty
        {
                Copy VOICEBUFFER to VOICEOUT
        }

// Copy receive data to host PC
```

```
        if InFrame.DATABUFFER not empty
        and DATAOUT not full
        {
                Copy data from InFrame.DATABUFFER to DATAOUT
 5      }

// Receive a multiplexer frame
        MuxCtrl.ReceiveNextFrame()

10      // Transmit a multiplexer frame
        MuxCtrl.TransmitNextFrame()

// Copy data from host PC to intermediate buffer
        if DATAIN not empty
15      and OutFrame.DATABUFFER not full
        {
                Copy data from DATAIN to OutFrame.DATABUFFER
        }

20      // Finish if MUXOFF command received from host PC
        if MuxCtrl.ReadCommand = MUXOFF exit
}
```

```
TransmitNextFrame()        // Assembles a multiplexer output frame for
                           // transmission under DMA
        {
5           // Check transmitter is ready for a new frame
            if OutFrame.Ready()
            {
                if VOICEIN empty
                // No voice to transmit, data only or empty frames transmitted
10              {
                    if Outframe.DATABUFFER not empty
                    {
                        if enough data octets to fill a frame
                        {
15
                            Outframe.Fill( D )
                        }
                        else
                        {
20                          Outframe.Fill( LD )
                        }
                    }
                    else OutFrame.Fill( SYNC )
                }
25              else
                // Voice to transmit
                {
                    if Outframe.DATABUFFER not empty
                    {
30                      if enough data octets to fill a frame
                        {
                            Outframe.Fill( VD )
                        }
                        else
35                      {
                            Outframe.Fill( VLD )
                        }
                    }
```

```
                    else OutFrame.Fill( V )
                }

// Send the frame
5               OutFrame.Sendframe()
            }
        }
}
```

```
ReceiveNextFrame()   // A multiplexer frame is received in InFrame.Read()
                     // Check status of InFrame.Read and resynchronise if
                     // three consecutive bad frames are detected
5   {
        switch Inframe.Read()
        {
            case NOFRAME :
            case   SYNC :
10          case   V :
            case   VD :
            case   VLD :
            case   D :
            case   LD :
15              // A good frame has been received, no action required default :

// A bad frame has been received
20              if three consecutive bad frames received
                {
                    MuxCtrl.GotoState( RESYNCHRONISE )
                }
        }
25  }
```

```
        /*

DmaChannel
 5
        Controls the DMA controller hardware

*/

10  class DmaChannel

// The following boolean is TRUE when a DMA has completed ( ie one
        // multiplexer frame has been input or output ) on the appropriate
        // channel
15
        DMACOMPLETED          // TRUE when DMA has completed // Methods 20  DmaStop()                 // Stop and initialise a DMA channel
        DmaStart()            // Start DMA channel
        DmaLoad( FRAME )      // Loads FRAME to the DMA controller. This frame
                              // be transmitted or received after the next
                              // DMA interrupt
25  Ready()                   // Returns the state of DMACOMPLETED, TRUE or FALSE
```

```
/*

Frame

Defines the structure of and storage for multiplexer frames

*/ class Frame : DmaChannel          // Note inheritance

// In the embodiment described, only one data (non voice) channel is
// is used. The following frame formats are used :

// H : Header ( number in brackets is the header used )
// Q : Qualifier, F : Fill, D : Data, V : Voice field ( number in
// brackets is the length of the field in octets SYNC            // Synchronisation , frame type 0
                    // H(0x19b3), Q(1),F(21)

V               // Voice only, frame type 2
                    // H(0x4ce6), V(17), F(5)

VD              // Voice and data, frame type 6
                    // H(0x2ad5), V(17), D(5)

VLD             // Voice and partial data ( L field required ), frame type 7
                    // H(0x1e3c), V(17), L(1), D(n), F(4-n)

D               // Data only, frame type 4
                    // H(0x34e9), D(22)

LD              // Partial data only ( L field required ), frame type 5
                    // H(0x3366), L(1), D(n), F(21-n)

FRAMETYPE       // Variable holding a frame format
```

// The following synchronisation states define the qualifier ( Q field )
// sent and received in synchronisation frames :

OUTOFSYNC          // '0x0' qualifier
5   SYNCING             // '0x7' qualifier
    INSYNC             // '0x38' qualifier SYNCSTATE          // Variable holding the synchronisation state 10 // The following is a temporary buffer for voice frames, it is only used
    // by RxFrame objects VOICEBUFFER    // Buffer for voice frames 15 // The following is a temporary buffer for non voice data, it is used by
    // both TxFrame and RxFrame objects DATABUFFER     // Buffer for non voice data 20 // The following buffers hold assembled frames to be transmitted and
    // received frames. There are two defined. One is accessed by the
    // DMA controller whilst the other is accessed by the multiplexer.

BUFFER[ 2 ]     // Buffers holding assembled multiplexer frames
25 ACTIVEFRAME    // Variable taking value 0 or 1, points to buffer
                         // currently being accessed by the multiplexer

/*

30 TxFrame

Defines methods for transmitting multiplexer frames

*/
35
    class TxFrame : Frame    // Note inheritance

Fill( FRAMETYPE )     // Assembles a transmit frame of the type FRAMETYPE

```
                                    // in BUFFER[ ACTIVEFRAME ]

// H field is defined by FRAMETYPE
                                    // Q field is defined by SYNCSTATE
                                    // V field is read from VOICEIN buffer
                                    // D field is read from DATABUFFER {
                switch FRAMETYPE
                { case SYNC :

Write H, Q and F fields to BUFFER[ ACTIVEFRAME ]

case V :

Write H, V and F fields to BUFFER[ ACTIVEFRAME ]

case   VD :

Write H, V and D fields to BUFFER[ ACTIVEFRAME ]

case   VLD :

Write H, V, L, D and F fields to BUFFER[ ACTIVEFRAME ]

case D :

Write H, and D fields to BUFFER[ ACTIVEFRAME ]

case LD :

Write H, D and F fields to BUFFER[ ACTIVEFRAME ]
                }
        }
```

```
        SendSyncFrame( Q )         // Assembles and transmits a synchronisation frame
                                    // with the Q qualifier when the DMA controller is
                                    // ready
        {
5           if DMACOMPLETED
            {
                // Assemble the frame
                Fill( SYNC )

10              // Set up the Dma controller
                DmaLoad( BUFFER[ ACTIVEFRAME ] )

DMACOMPLETED = FALSE
                ACTIVEFRAME = !ACTIVEFRAME
15          }
        }

SendFrame()       // Transmits a non synchronisation frame
20
        {
            if DMACOMPLETED
            {
                // Set up the DMA controller
25              DmaLoad( BUFFER[ACTIVEFRAME] )

DMACOMPLETED = FALSE
                ACTIVEFRAME = !ACTIVEFRAME
            }
30      }
```

```
/*

RxFrame

Defines the methods for receiving multiplexer frames

*/ class RxFrame : Frame      // Note inheritance

Read()                 // Processed a receive multiplexer frame

{
        if DMACOMPLETED
        // If a receive frame is available
        {
            DMACOMPLETED = FALSE // Test header
            Read header position in BUFFER[ ACTIVEFRAME ]

if exact match found store header switch header
            {
                case SYNC :

FRAMETYPE = SYNC case V :

FRAMETYPE = V case VD :

FRAMETYPE = VD
```

```
                    case VLD :

FRAMETYPE = VLD case D :

FRAMETYPE = D case LD :

FRAMETYPE = LD default :

// Header error, get closest match
                        FRAMETYPE = HammingDistance()
                        Increment header error counter
                }
                switch FRAMETYPE
                {
                    case SYNC :

// Test qualifier
                        switch Qualifier
                        {
                            case 0x0 :

switch SYNCSTATE
                                {
                                    case OUTOFSYNC :

If three consecutive 0x0  received
                                        {
                                            SYNCSTATE = SYNCING
                                        } case    SYNCING :
```

```
                    No action required default :

SYNCSTATE = OUTOFSYNC
            } case 0x7 :

switch SYNCSTATE
            {
                case OUTOFSYNC :

If three consecutive 0x7
                        received
                    {
                        SYNCSTATE = SYNCING
                    } case SYNCING :

SYNCSTATE = INSYNC default :

No action required
                }
            } case V :

Copy V field from BUFFER[ ACTIVEFRAME ]
            to VOICEBUFFER case  VD :

Copy V field from BUFFER[ ACTIVEFRAME ]
            to VOICEBUFFER
```

```
                    Copy D field from BUFFER[ ACTIVEFRAME ]
                    to DATABUFFER case VLD :

Copy V field from BUFFER[ ACTIVEFRAME ]
                    to VOICEBUFFER

Copy D field ( L octets ) from BUFFER[ ACTIVEFRAME]
                    to DATABUFFER case   D :

Copy D field from BUFFER[ ACTIVEFRAME ]
                    to DATABUFFER case LD :
                    Copy D field ( L octets ) from BUFFER[ACTIVEFRAME]
                    to DATABUFFER
            }

// Set up DMA channel
    DmaLoad( BUFFER[ ACTIVEFRAME ] )

ACTIVEFRAME = !ACTIVEFRAME
    return FRAMETYPE
    }
    // Indicate frame not received
    else return NOFRAME
}

HammingDistance()    // Returns FRAMETYPE that matches closest to
                     // the H field in BUFFER[ ACTIVEFRAME ]
{
}
```

```
/*

DMAInterrupt()

Executed when a DMA transfer has completed, ie when a multiplexer frame has been input
    or output. Sets DMACOMPLETED flag true for the appropriate DMA channel

*/

DMAInterrupt()
    {
        if input DMA completed
        {
            Inframe.DMACOMPLETED = TRUE
        }
        if output DMA completed
        {
            Outframe.DMACOMPLETED = TRUE
        }
    }
```

Second Embodiment

In this embodiment of the invention, the multiplexer uses a variable length frame to eliminate the effects of clock error 1. The following constraints apply :

1. Nominal multiplexer frame length = nOS / nFS where nOS : Number of octets transmitted on the physical layer per
              second
         nFS : Number of frames produced by the speech coder per second 2. The multiplexer may compress a transmitted frame ( ie shorten it by 1 octet ) or expand a transmitted frame ( ie lengthen it by 1 octet ). Compression and expansion is controlled by a timing algorithm, it compensates for clock error 1.

Second Embodiment

In this embodiment of the invention, the multiplexer uses a variable length frame to eliminate the effects of clock error 1. The following constraints apply:

1. Nominal multiplexer frame length=nOS/nFS
   where nOS: Number of octets transmitted on the physical layer per second
   nFS: Number of frames produced by the speech coder per second
2. The multiplexer may compress a transmitted frame (ie shorten it by 1 octet) or expand a transmitted frame (ie lengthen it by 1 octet). Compression and expansion is controlled by a timing algorithm, it compensates for clock error 1.
3. The multiplexer does not compress or expand consecutive transmitted frames.

For example
   nOS=1200 octets/second, nFS=50 frames/second, nV=16 octets
   Nominal multiplexer frame length=1200/50=24 octets
   Compressed frame length=23 octets
   Expanded frame length=25 octets Now assume that there is a 1% error between the multiplexer clock and the speech coder clock ie clock error 1=1%
   Line data rate=nOS*8=9600 bps
   Speech coder data rate=nFS*nV* 8=6400 bps The multiplexer always transmits nV voice octets per frame.

With a 1% clock error, 1 in 100 speech coder frames would be in error at the transmitter due to the accumulating error (if the speech coder is overspeed then 1 in 100 frames are lost, if it is underspeed then 1 in 100 are repeated).

The cumulative error in 1 second is 6400*0.01=64 bits or 8 octets.

In the overspeed case, if 8 frames per second are compressed this error is cancelled out and no voice frames are lost. In the underspeed case 8 frames per second must be expanded.

A timing algorithm at the transmitter measures clock error 1 to determine the rate at which frames should be compressed or expanded. In the example shown, by compressing or expanding 1 in 2 frames (the multiplexer will not compress or expand consecutive frames) a clock error of up to approx 3% can be eliminated.

At the receiver, the multiplexer must now search for a header in one of three positions: normal, compressed or expanded. The three possible header positions are scored using an XOR function. The wrong header position will only be chosen when the real header has more than two bit errors (the headers are hamming codes with a minimum distance of 5) and a false header postion matches a header hamming code with two or less bit errors. The probability of this is very small.

The transmitting multiplexer does not compress or expand consecutive frames. This prevents the number of header positions to be searched at the receiver from accumulating after one frame has been received with a header in error.

Figure 1:
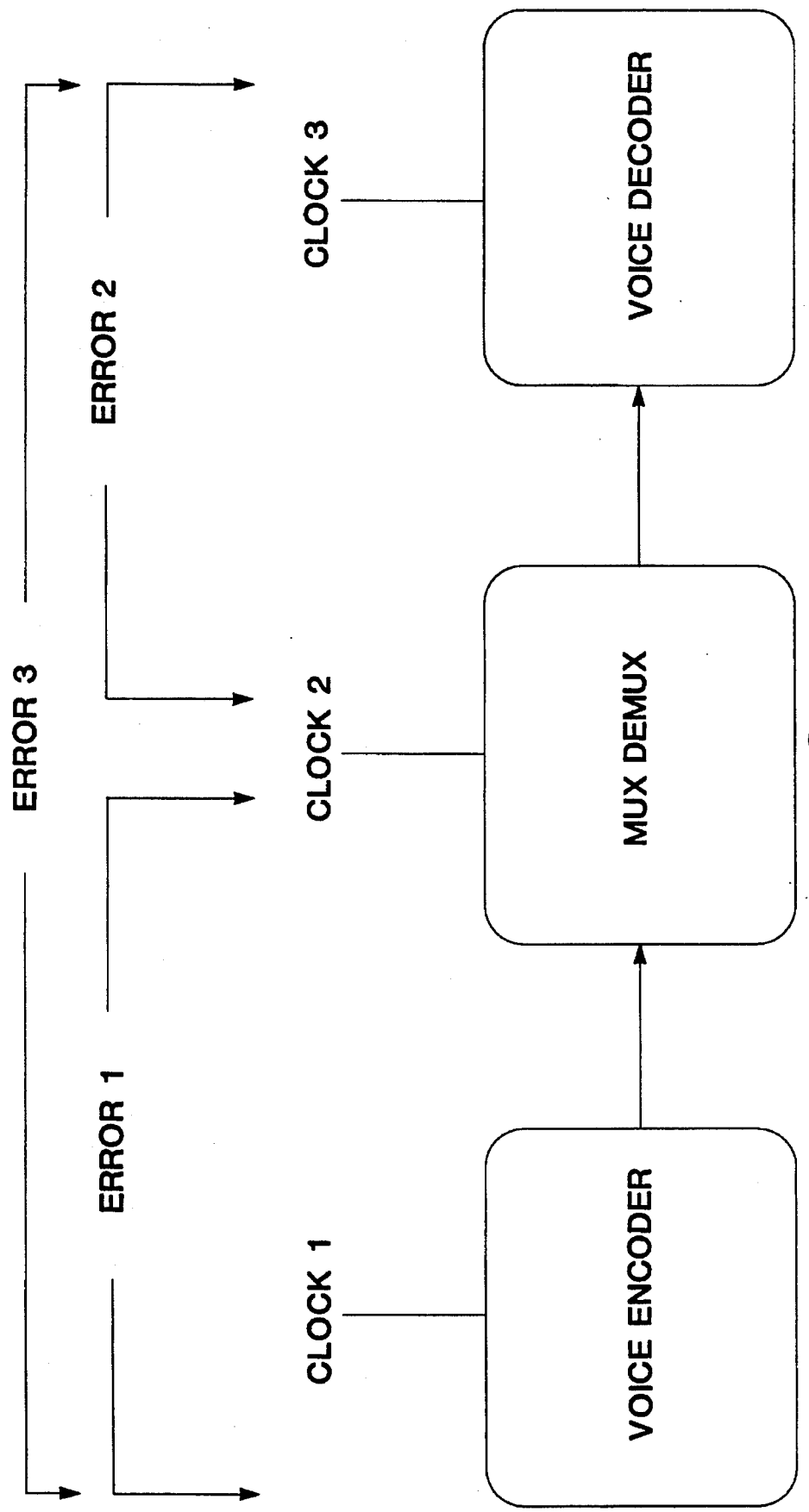
FIG. 1 is a diagram referred to above relating to timing errors.

The length adjustment affects only a small proportion of multiplexer frames. For example, if the clock error 1 in FIG. 1 is 100 ppm, at a channel data rate of 9600 bps 0.96 bits of error will build up each second. One octet of error will therefore take 8.33 seconds to build up and this is equivalent to 208 frames. Therefore, in this example, only 0.5% of frames will need stretching or compressing.

If a header is missed completely then the potential positions for the next header are searched. Since no two consecutive multiplexer frames can both be compressed or stretched the number of possible header positions is still three. The same approach is used to find the position of this header and in this way it is possible to recover the previous frame without its header. If this fails then there is a need to resynchronise as for the start of a call.

As the headers are error protected by hamming codes, the multiplexer is able to correct up to 2 bit errors in the receive header. A count of receive errors in headers is maintained. If consecutive receive headers have to be corrected then synchronisation has been lost and the receive multiplexer must synchronise again as for the start of a call.

In one implementation of this embodiment, the multiplexer 50 is implemented in software which executes on an intelligent communications card fitted in a host PC as described above with reference to FIG. 6 in relation to the first embodiment.

Likewise the buffers in RAM 54 are also as shown in FIGS. 7 and 8 and the operation is the same as for the first embodiment except for the timing aspects described as follows.

One of the timers in the V40 counts modem clock pulses. When the host PC writes a voice frame to the multiplexer an interrupt is generated, the timer is read and reset in the interrupt service routine. The timing error between the modem and the voice coder is estimated from the value of this timer and an accumulating total is kept. When one octet of error has built up a flag is generated which causes the next transmit multiplexer frame to be compressed or expanded as appropriate.

The receiving multiplexer checks the three possible header positions, for compressed, normal or expanded frames.

In the embodiment described the modem data rate is 14400 bps or 1800 octets per second. The voice coder operates at 6800 bps and generates 50 frames per second. Each voice coder frame is therefore 17 octets.

Using the equations listed above:
   Nominal multiplexer frame length=1800/50=36 octets
   Compressed frame length=35 octets
   Expanded frame length=37 octets The following is the pseudo code for this second embodiment. The software has been written in C++, an object oriented programming language. Only those sections of the software running on the intelligent communications card that relate to the multiplexer have been described.

```
/*

Main

Define objects and execute multiplexer controller

*/

// Object definitions

MuxController      MuxCtrl
        TxFrame            OutFrame
        RxFrame            InFrame main()
        {
                do
                {
                        MuxCtrl.Update()
                }
                while(1)
        }
```

```
/*

HostInterface

Defines and controls the interface between the host PC and the multiplexer.

*/ class HostInterface

// The following buffers contain control, status, voice and data
    // exchanged between the multiplexer and the host PC :

MUXCOMMAND      // Commands from the host PC to the multiplexer
    MUXSTATUS       // Status returned to the host PC from the mutliplexer
    VOICEIN         // Voice frames to be transmitted by the multiplexer
    VOICEOUT        // Voice frames received by the mutliplexer // Note that there is one DATAIN and DATAOUT buffer allocated for each
    // data channel on the multiplexer.

DATAIN          // Data (non voice) to be transmitted by the multiplexer
    DATAOUT         // Data (non voice) received by the multiplexer // Methods ReadCommand()           // Reads a command from MuxCommand
                            // Relevant commands are :
                            //    MUXOFF : terminates multiplexer execution WriteStatus(STATUS)     // Writes status to MuxStatus
                            // Relevant stati are :
                            //    SYNCHRONISED : multiplexer has synchronised
                            //    RESYNCHRONISING : multiplexer has lost
                            //                      synchronisation
```

```
    /*

StateMachine

5   */ class StateMachine

// Methods
10
    GotoState( STATE )  // Sets statemachine to a new state, STATE Getstate()          // Returns the state of statemachine

15
```

```
/*

MuxController

Top level control for the multiplexer. The action performed depends upon the current state
    of the multiplexer.

*/ class MuxController : HostInterface, StateMachine   // Note inheritance

// A multiplexer can be in one of the following states :

RESYNCHRONISE          // Initialises the multiplexer for a resync, at
                       // power up or after a sync loss
SYNCHRONISING          // Transmit and receive synchronisation frames
VOICEDATA              // Transmit and receive voice and data frames // Methods Update()               // Call handler for appropriate state of the
                       // multiplexer
{
    switch MuxCtrl.GetState ()
    {
        case RESYNCHRONISE :

MuxCtrl.Resynchronise()
            MuxCtrl.GotoState( SYNCHRONISING )

case  SYNCHRONISING :

MuxCtrl.Synchronising()

case  VOICEDATA

MuxCtrl.VoiceDataHandler()
```

```
            }
          while (1)
      }

5   Resynchronise()
      {
              // Stop and reinitialise DMA channels
              InFrame.DmaStop()
              OutFrame.DmaStop()
10

// Start input and output DMA channels
              // of synchronisation
              InFrame.DmaStart()
              OutFrame.DmaStart()
15

// Send and receive 'out of sync' synchronisation frames
              InFrame.SYNCSTATE = OUTOFSYNC // Write multiplexer status to host PC
20            MuxCtrl.WriteStatus( RESYNCHRONISING )
      }
```

```
Synchronising()       // Send appropriate synchronisation frame
{
        if InFrame.Read() != NOFRAME
        {
                switch Inframe.SYNCSTATE
                {
                        case OUTOFSYNC :

OutFrame.SendSyncFrame( 0x0 )

case   SYNCING :

OutFrame.SendSyncFrame( 0x7 )

case   INSYNC :

// Send only one frame of this type then advance
                                // state and inform host that the multiplexer is
                                // now in synchronisation
                                OutFrame.SendSyncFrame( 0x38 )
                                MuxCtrl.Gotostate( VOICEDATA )
                                MuxCtrl.WriteStatus( SYNCHRONISED )
                }
        }
}

VoiceDataHandler()   // Send voice and data frames
{

// Copy receive voice frames to host PC
        if  InFrame.VOICEBUFFER full
        and VOICEOUT empty
        {
                Copy VOICEBUFFER to VOICEOUT
        }

// Copy receive data to host PC
```

```
      if InFrame.DATABUFFER not empty
      and DATAOUT not full
      {
              Copy data from InFrame.DATABUFFER to DATAOUT
 5    }

// Receive a multiplexer frame
      MuxCtrl.ReceiveNextFrame()

10    // Transmit a multiplexer frame
      MuxCtrl.TransmitNextFrame()

// Copy data from host PC to intermediate buffer
      if DATAIN not empty
15    and OutFrame.DATABUFFER not full
      {
              Copy data from DATAIN to OutFrame.DATABUFFER
      }

20    // Finish if MUXOFF command received from host PC
      if MuxCtrl.ReadCommand = MUXOFF exit
}
```

```
         TransmitNextFrame()           // Assembles a multiplexer output frame for
                                       // transmission under DMA
         {
 5           // Check transmitter is ready for a new frame
             if OutFrame.Ready()
             {
                 if VOICEIN empty
                 // No voice to transmit, data only or empty frames transmitted
10               {
                     if Outframe.DATABUFFER not empty
                     {
                         if enough data octets to fill a frame
                         {
15                           Outframe.Fill( D )
                         }
                         else
                         {
                             Outframe.Fill( LD )
20                       }
                     }
                     else OutFrame.Fill( SYNC )
                 }
                 else
25               // Voice to transmit
                 {
                     if Outframe.DATABUFFER not empty
                     {
                         if enough data octets to fill a frame
30                       {
                             Outframe.Fill( VD )
                         }
                         else
                         {
35                           Outframe.Fill( VLD )
                         }
                     }
                     else OutFrame.Fill( V )
```

```
            }

// Send the frame
                    OutFrame.Sendframe()
5           }
    }
```

```
        ReceiveNextFrame()  // A multiplexer frame is received in InFrame.Read()
                            // Check status of InFrame.Read and resynchronise if
                            // three consecutive bad frames are detected
5    {
            switch Inframe.Read()
            {
                    case NOFRAME :
                    case    SYNC :
10                  case    V :
                    case    VD :
                    case    VLD :
                    case    D :
                    case    LD :
15                          // A good frame has been received, no action required default :

// A bad frame has been received
20                          if three consecutive bad frames received
                            {
                                    MuxCtrl.GotoState( RESYNCHRONISE )
                            }
            }
25   }
```

```
        /*

DmaChannel
5
        Controls the DMA controller hardware

*/

10  class DmaChannel

// The following boolean is TRUE when a DMA has completed ( ie one
        // multiplexer frame has been input or output ) on the appropriate
        // channel
15
        DMACOMPLETED            // TRUE when DMA has completed // Methods 20  DmaStop()                  // Stop and initialise a DMA channel
        DmaStart()              // Start DMA channel
        DmaLoad( FRAME )        // Loads FRAME to the DMA controller. This frame
                                // be transmitted or received after the next
                                // DMA interrupt
25  Ready()                    // Returns the state of DMACOMPLETED, TRUE or FALSE
```

```
/*

Frame

5   Defines the structure of and storage for multiplexer frames

*/ class Frame : DmaChannel        // Note inheritance
10
    // In the embodiment described, only one data (non voice) channel is
    // is used. The following frame formats are used :

// H : Header ( number in brackets is the header used )
15  // Q : Qualifier, F : Fill, D : Data, V : Voice field ( number in
    // brackets is the length of the field in octets for nominal length
    // multiplexer frames SYNC            // Synchronisation , frame type 0
20                      // H(0x19b3), Q(1),F(33)

V               // Voice only, frame type 2
                        // H(0x4ce6), V(17), F(17)

25      VD              // Voice and data, frame type 6
                        // H(0x2ad5), V(17), D(17)

VLD             // Voice and partial data ( L field required ), frame type 7
                        // H(0x1e3c), V(17), L(1), D(n), F(16-n)
30
        D               // Data only, frame type 4
                        // H(0x34e9), D(34)

LD              // Partial data only ( L field required ), frame type 5
35                      // H(0x3366), L(1), D(n), F(33-n)

FRAMETYPE       // Variable holding a frame format
```

// The following synchronisation states define the qualifier ( Q field )
// sent and received in synchronisation frames :

```
    OUTOFSYNC            // '0x0' qualifier
5   SYNCING              // '0x7' qualifier
    INSYNC               // '0x38' qualifier SYNCSTATE            // Variable holding the synchronisation state
```

10 // The following is a temporary buffer for voice frames, it is only used
// by RxFrame objects

```
    VOICEBUFFER    // Buffer for voice frames
```

15 // The following is a temporary buffer for non voice data, it is used by
// both TxFrame and RxFrame objects

```
    DATABUFFER     // Buffer for non voice data
```

20 // The following buffers hold assembled frames to be transmitted and
// received frames. There are two defined. One is accessed by the
// DMA controller whilst the other is accessed by the multiplexer.

```
    BUFFER[ 2 ]         // Buffers holding assembled multiplexer frames
25  ACTIVEFRAME         // Variable taking value 0 or 1, points to buffer
                        // currently being accessed by the multiplexer
```

/*
30
TxFrame

Defines methods for transmitting multiplexer frames

35 */

// The following booleans are used to flag generation of compressed or
// expanded multiplexer frames

```
        COMPRESS           // Generate a compressed multiplexer frame
        EXPAND             // Generate an expanded multiplexer frame class TxFrame : Frame        // Note inheritance
5
        Fill( FRAMETYPE )            // Assembles a transmit frame of the type FRAMETYPE
                                     // in BUFFER[ ACTIVEFRAME ]

// H field is defined by FRAMETYPE
10                                   // Q field is defined by SYNCSTATE
                                     // V field is read from VOICEIN buffer
                                     // D field is read from DATABUFFER {
15          if COMPRESS
            {
                    decrement frame length
                    COMPRESS = FALSE
            }
20          if EXPAND
            {
                    increment frame length
                    EXPAND = FALSE
            }
25
            switch FRAMETYPE
            {
                    case SYNC :

30                          Write H, Q and F fields to BUFFER[ ACTIVEFRAME ]

case V :

Write H, V and F fields to BUFFER[ ACTIVEFRAME ]
35
                    case   VD :

Write H, V and D fields to BUFFER[ ACTIVEFRAME ]
```

```
        case   VLD :

Write H, V, L, D and F fields to BUFFER[ ACTIVEFRAME ]

5       case D :

Write H, and D fields to BUFFER[ ACTIVEFRAME ]

case LD :
10
            Write H, D and F fields to BUFFER[ ACTIVEFRAME ]
        }
    }
15
```

```
    SendSyncFrame( Q )        // Assembles and transmits a synchronisation frame
                              // with the Q qualifier when the DMA controller is
                              // ready
5   {
            if DMACOMPLETED
            {
                    // Assemble the frame
                    Fill( SYNC )
10
                    // Set up the Dma controller
                    DmaLoad( BUFFER[ ACTIVEFRAME ] )

DMACOMPLETED = FALSE
15                  ACTIVEFRAME = !ACTIVEFRAME
            }
    }

20  SendFrame()               // Transmits a non synchronisation frame

{
            if DMACOMPLETED
            {
25                  // Set up the DMA controller
                    DmaLoad( BUFFER[ACTIVEFRAME] )

DMACOMPLETED = FALSE
                    ACTIVEFRAME = !ACTIVEFRAME
30          }
    }
```

```
/*

RxFrame

Defines the methods for receiving multiplexer frames

*/ class RxFrame : Frame            // Note inheritance

Read()              // Processed a receive multiplexer frame

{
        if DMACOMPLETED
        // If a receive frame is available
        {
            DMACOMPLETED = FALSE // Test header
            Read three header positions in BUFFER[ ACTIVEFRAME ]

if exact match found store header switch header
            {
                case SYNC :

FRAMETYPE = SYNC case V :

FRAMETYPE = V case  VD :

FRAMETYPE = VD
```

```
                    case VLD :

FRAMETYPE = VLD 5                   case D :

FRAMETYPE = D case LD :
10
                         FRAMETYPE = LD default :

15                       // Header error, get closest match
                         FRAMETYPE = HammingDistance()
                         Increment header error counter
               }

20       switch FRAMETYPE
         {
               case SYNC :

// Test qualifier
25                  switch Qualifier
                    {
                         case 0x0 :

switch SYNCSTATE
30                            {
                                   case OUTOFSYNC :

If three consecutive 0x0
                                            received
35                                      {
                                            SYNCSTATE = SYNCING
                                        }
```

```
                        case   SYNCING :

No action required default :

SYNCSTATE = OUTOFSYNC
                        } case 0x7 :

switch SYNCSTATE
                        {
                              case OUTOFSYNC :

If three consecutive 0x7
                                       received
                                    {
                                          SYNCSTATE = SYNCING
                                    } case SYNCING :

SYNCSTATE = INSYNC default :

No action required
                        }
                  } case V :

Copy V field from BUFFER[ ACTIVEFRAME ]
                  to VOICEBUFFER case   VD :
```

```
                    Copy V field from BUFFER[ ACTIVEFRAME ]
                    to VOICEBUFFER Copy D field from BUFFER[ ACTIVEFRAME ]
5                   to DATABUFFER case VLD :

Copy V field from BUFFER[ ACTIVEFRAME ]
10                  to VOICEBUFFER

Copy D field ( L octets ) from BUFFER[ ACTIVEFRAME]
                    to DATABUFFER 15          case   D :

Copy D field from BUFFER[ ACTIVEFRAME ]
                    to DATABUFFER 20          case LD :

Copy D field ( L octets ) from BUFFER[ ACTIVEFRAME]
                    to DATABUFFER
            }
25

// Set up DMA channel
        DmaLoad( BUFFER[ ACTIVEFRAME ] )

30      ACTIVEFRAME = !ACTIVEFRAME
        return FRAMETYPE
        }
        // Indicate frame not received
        else return NOFRAME
35  }

HammingDistance()       // Returns FRAMETYPE that matches closest to
                                // the H field in BUFFER[ ACTIVEFRAME ]
```

// the H field in BUFFER[ ACTIVEFRAME ]

{
}
5

```
/*

DMAInterrupt()

Executed when a DMA transfer has completed, ie when a multiplexer frame has been input
    or output. Sets DMACOMPLETED flag true for the appropriate DMA channel

*/

DMAInterrupt()
    {
        if input DMA completed
        {
            Inframe.DMACOMPLETED = TRUE
        }
        if output DMA completed
        {
            Outframe.DMACOMPLETED = TRUE
        }
    }

/*

HostInterrupt()

Executed when the host PC writes a speech frame to the multiplexer. Calculates the
    accumulated timing error and generates a COMPRESS or EXPAND flag as appropriate.

*/

HostInterrupt()
    {
        read and reset timer
        calculate accumulated error
        if one octet of overspeed error
        {
```

```
                OutFrame.COMPRESS = TRUE
        }
        if one octet of underspeed error
        {
5               OutFrame.EXPAND = TRUE
        }
}
```

The present invention provides a multiplexer system which combines the advantages of Time Division Multiplexing (TDM) and Statistical Multiplexing techniques ie the efficiency and low delay of the former with the flexibility of the latter. It is optimised for, though not necessarily restricted to, voice and data multiplexing on restricted bandwidth channels such as those provided by PSTN modems.

The synchronous, frame oriented, voice signal is combined with other data with very little overhead, the multiplexer is typically 92% efficient. In the implementations described, the voice dam produced by a low bit rate voice coder and it is generated in regular, fixed length frames. In many applications it is not possible to synchronise the voice coder frames to the clock of the transmission channel. This multiplexer schemes described eliminates the effect of clock error due to this problem and ensure that no voice coder frames are lost at the transmitter.

The invention allows the integration of a framed data channel, such as a voice channel, with serial data channels in a manner which does not require the clock controlling the source of framed data and the channel clock to be locked together whilst maintaining efficient use of bandwidth.

The invention further provides for the elimination of transmission errors in the framed data due to clock errors, which is a particularly significant advantage when the framed data has already undergone compression.

Some low bit rate voice coders employ silence detection. This multiplexer scheme integrates these coders easily, voice frames not containing voice need not be transmitted and all the bandwidth can be used for data. The frame type transmitted by the multiplexer can change from frame to frame thus ensuring efficient use of bandwidth.

The multiplexer scheme is inherently robust to errors on the transmission channel. All frame headers are error protected and there is support for error detection and correction on both the voice and the data components of a multiplexer frame.

It will be understood that the present invention is not limited to the implementations described here. Another implementation of the first embodiment uses the GSM transparent service. This is a mobile data service which offers 9600 bps asynchronous data at the DTE port of the GSM mobile. This multiplexer scheme therefore has applications in radio communications.

I claim:

1. A system for multiplexing framed digital data having frames of predetermined size with other data for transmission on a single physical channel, comprising:
   a) means for receiving from a source of framed digital data the framed digital data at a first frame rate, wherein the source of framed digital data is controlled by a first clock;
   b) means for receiving the other data;
   c) means for generating multiplexer frames under the control of a second clock, the multiplexer frames being of a substantially predetermined size, wherein an individual multiplexer frame incorporates the framed digital data and/or other data according to whether the framed digital data and/or the other data is available for inclusion in that individual multiplexer frame and a header containing information about the contents of the individual multiplexer frame;
   d) means for comparing clock rates of the first clock and the second clock;
   e) means for calculating a cumulative error between the first clock and the second clock and for adjusting the length of an individual multiplexer frame to be transmitted from the multiplexer by a predetermined amount whenever said cumulative error reaches a predetermined threshold, said individual multiplexer frame being transmitted from the multiplexer being received by a demultiplexer as a received individual multiplexer frame; and
   f) means for ensuring that no two successive individual multiplexer frames have a same length adjustment.

2. A system for multiplexing framed digital data having frames of predetermined size with other data for transmission on a single physical channel, comprising:
   a) means for receiving from a source of framed digital data the framed digital data at a first frame rate, wherein the source of framed digital data is controlled by a first clock;
   b) means for receiving the other data;
   c) means for generating multiplexer frames under the control of a second clock, the multiplexer frames being of a substantially predetermined size, wherein an individual multiplexer frame:
      (1) incorporates the framed digital data and/or other data according to whether the framed digital data and/or the other data is available for inclusion in that individual multiplexer frame and a header containing information about the contents of that individual multiplexer frame, and
      (2) has a length chosen so that the multiplexer frames are transmitted at a second frame rate wihich is faster than the first frame rate.

3. A system according to claim 1 wherein said predetermined amount is one octet.

4. A system according to claim 1 wherein the means for calculating a cumulative error between the first clock and the second clock and for adjusting the length of an individual multiplexer frame to be transmitted includes means for establishing a position of a header in a received individual multiplexer frame.

5. A system according to claim 1 wherein the header in the individual multiplexer frame is used as a frame delimiter.

6. A system according to claim 1 wherein the header in the individual multiplexer frame is error protected.

7. A system according to claim 6 wherein each header selected to represent frame content information has a chosen hamming code distance from each other header.

8. A system according to claim 1 in which the framed data is voice data.

* * * * *

UNITED STATES PATENT AND TRADEMARK OFFICE
CERTIFICATE OF CORRECTION

PATENT NO. : 5,488,610

DATED : January 30, 1996

INVENTOR(S) : Stephen Morley

It is certified that error appears in the above-indentified patent and that said Letters Patent is hereby corrected as shown below:

Column 4, line 26, after "state" insert --.--.

Column 5, line 4, change "dam" to --data--.

Column 5, line 11, change "Receive" to --Received--.

Column 5, line 52, delete "and".

Column 6, line 10, change "e.g." to --e.g.,--

Column 6, line 16, change "ram" to --rate--.

Column 6, line 47, after fields, add "that".

Column 7, line 53, after "it" add --is--.

Column 7, line 53, change "ie" to --i.e.,--.

Column 8, line 3, change "ie" to --i.e.,--.

Column 8, line 45, change "overspeed" to --oversped--.

Column 8, line 54, change "flames" to --frames--.

UNITED STATES PATENT AND TRADEMARK OFFICE
CERTIFICATE OF CORRECTION

PATENT NO. : 5,488,610
DATED : January 30, 1996
INVENTOR(S) : Stephen Morley

It is certified that error appears in the above-indentified patent and that said Letters Patent is hereby corrected as shown below:

Column 10, line 23, change "dam" to --data--.

Column 100, line 40, change "wihich" to --which--.

Signed and Sealed this

Sixth Day of August, 1996

BRUCE LEHMAN

*Attest:*

*Attesting Officer*     *Commissioner of Patents and Trademarks*